Figure 1:
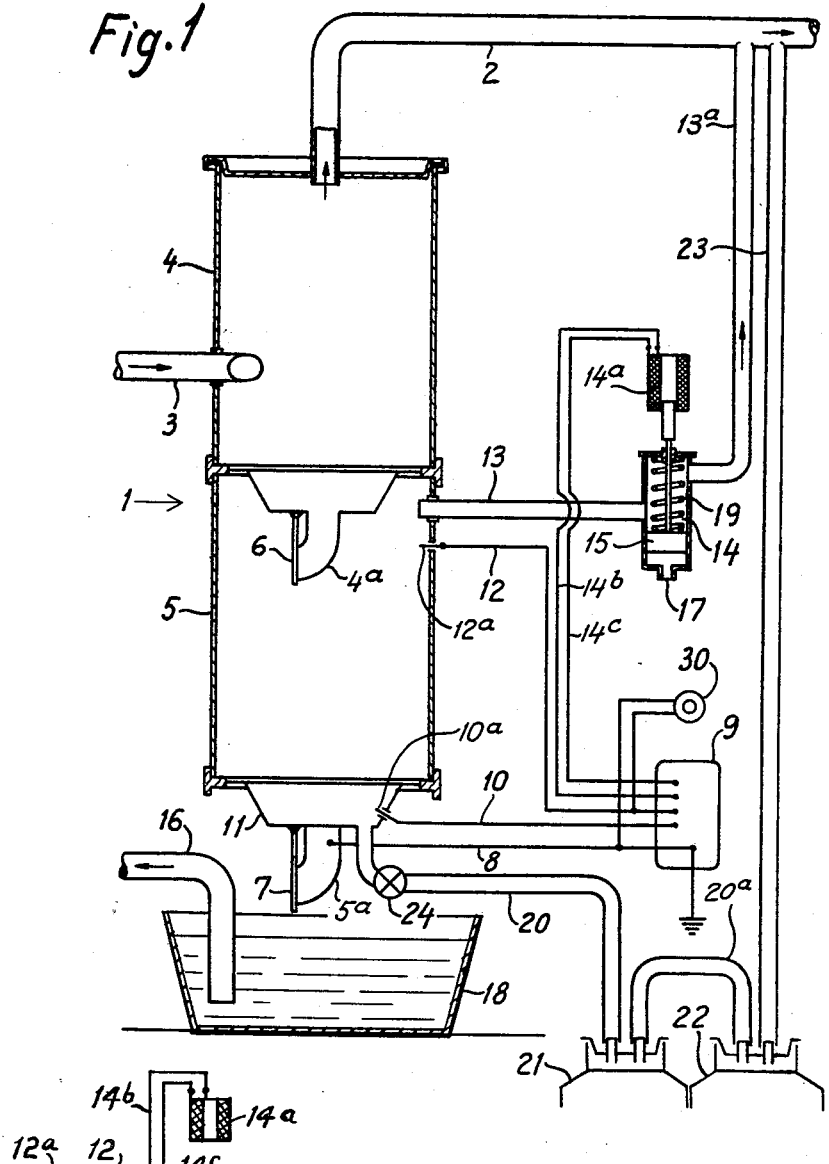

July 17, 1962 E. BAUM 3,044,443
RELEASER FOR MILKING MACHINE PLANTS
Filed June 21, 1960

INVENTOR.
Engelbert Baum
BY Davis, Hoxie, Faithfull & Hapgood
Attorneys ated July 17, 1962

3,044,443
RELEASER FOR MILKING MACHINE PLANTS
Engelbert Baum, Vienna, Austria, assignor to Aktiebolaget Separator, Stockholm, Sweden, a corporation of Sweden
Filed June 21, 1960, Ser. No. 37,699
Claims priority, application Austria June 25, 1959
8 Claims. (Cl. 119—14.06)

This invention relates to milking machine plants or milking systems of the type having a milk pipe line and a vacuum pipe line connected to a releaser for withdrawing milk from the system. More particularly, the invention relates to an improved milk releaser which also serves for use in washing the milk pipe line.

An object of the invention is to provide an improved universal releaser of the type described which, during the milking operation, is operable to discharge the milk through the releaser while filling cans from the releaser which are maintained under vacuum.

A further object is to provide a universal releaser operable to withdraw a milk sample or a larger amount of milk from the system without interrupting the milking operation and while a milk can remains connected to the system for receiving milk therefrom; and which is operable with improved economy in the operation of washing the milking system.

A releaser made according to the invention comprises container means forming an upper chamber connected to both the milk pipe line and the vacuum pipe line of the milking system, whereby liquid can be drawn from the milk line into the chamber by partial evacuation thereof through the vacuum line, the container means also forming a lower chamber having a liquid inlet from the upper chamber and having a liquid outlet. Valve means for this inlet and outlet are operable to open the inlet and close the outlet upon creation of a partial vacuum in the lower chamber and to close the inlet and open the outlet upon breaking this vacuum. The releaser also comprises control means including a device responsive to a predetermined low liquid level in the lower chamber for connecting it to the vacuum line, and a device responsive to a predetermined high liquid level in the lower chamber for venting it to atmosphere.

In the preferred construction, the control means also include a control valve having a vent to atmosphere and operable in a first position to connect the lower chamber to this vent and in a second position to connect the vacuum line to the lower chamber while disconnecting the latter chamber from the vent, and means including an electromagnet, such as a solenoid, operatively connecting the control valve to the level responsive devices, which may be electrical contacts at the upper and lower portions, respectively, of the lower chamber. Also, the releaser preferably comprises a pipe leading from the bottom portion of the lower chamber and forming a second liquid outlet therefrom for filling one or more cans located below the lower chamber and maintained under a partial vacuum through a connection to the vacuum line, this pipe preferably having a valve for opening and closing the second outlet to the can or cans.

If the pipe forming the second liquid outlet from the lower chamber is connected to a large number of milk cans in series, forming a battery of cans, it may happen, especially in filling one of the last cans in the series, that the resistance against flow of the milk through the can battery will become so great that the milk level rises in the lower chamber of the releaser. If this level rises sufficiently to bring the high level responsive device into operation, the lower chamber is automatically vented to atmosphere so that milk from this chamber, instead of flowing through the second outlet into the can battery, flows through the first or automatically valved outlet from the lower chamber. This effect may also be obtained by simply closing the valve in the pipe forming the second outlet to the can battery. Thus, milk from the releaser may be by-passed from the can battery, as for taking samples or for any other purpose.

The new releaser preferably comprises also an element included in the control means and operable to vent the lower chamber to atmosphere independently of the high level responsive device. Consequently, by operation of this element, the lower chamber of the releaser may be made to discharge milk through the automatically controlled outlet at any time before the milk rises to the relatively high level in this chamber, so that a relatively small quantity of milk may be withdrawn from this chamber for sampling or for any other purpose. This element may be a switch for short circuiting the high level responsive device so as to operate the control valve to vent the lower chamber to atmosphere regardless of the liquid level in the lower chamber.

Figure 2:
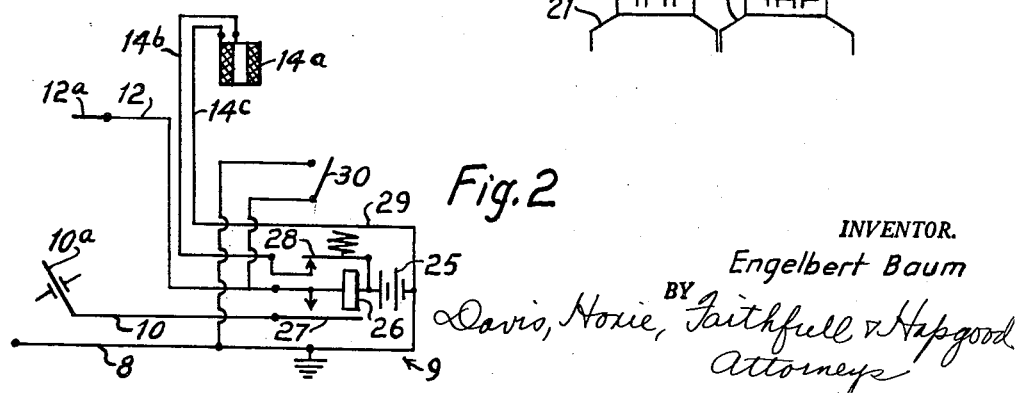

For a better understanding of the invention, reference may be had to the accompanying drawings, in which
FIG. 1 is a schematic view of a preferred form of the new releaser, and
FIG. 2 is a wiring diagram illustrating in greater detail the circuitry in FIG. 1.

The universal releaser, as illustrated, comprises container means 1 forming an upper chamber 4 and a lower chamber 5. Extending from the closed top of the upper chamber 4 is a pipe 2 leading to a vacuum pump (not shown) and which therefore may be referred to as a vacuum pipe line. A milk pipe line 3 opens tangentially into chamber 4, to which it leads from the usual milker units (not shown). Thus, by partial evacuation of the upper chamber 4 through vacuum line 2, milk can be drawn into chamber 4 through pipe 3 from the milking units. The chambers 4–5 are in direct communication with each other through a duct 4a forming an inlet to the lower chamber 5 from the bottom of the upper chamber 4; and the lower chamber 5 is provided with a recessed bottom 11 forming a discharge conduit or outlet 5a. The inlet 4a and outlet 5a of chamber 5 are controlled by valve means in the form of flap valves 6 and 7, respectively.

An electrical conductor or wire 8 is connected to the bottom discharge conduit 5a and leads to relay circuitry indicated generally at 9, this circuitry being illustrated in greater detail in FIG. 2. An electrical contact or probe 10a extends into the bottom portion of chamber 5, this contact being mounted in the bottom part 11 and suitably insulated therefrom. The contact 10a is connected to the relay circuitry 9 through a wire 10. In the upper portion of the lower chamber 5 is another electrical contact or probe 12a, the latter extending through the chamber wall and being suitably insulated therefrom. The upper contact 12a is connected to the relay circuitry 9 through wire 12. A pipe 13 leads from the upper portion of chamber 5 and is connected through a control valve 14 and pipe 13a to the vacuum line 2. The pipe 13 opens into the lower chamber 5 above the level of the upper contact 12a.

The control value 14 has a movable value member or piston 15 operable in a lowered position, as shown, to connect chamber 5 to vacuum line 2 through pipes 13—13a, while maintaining the chamber 5 disconnected from an air vent 17. A spring 19 normally holds the valve member 15 in this lowered position. However, when the valve member 15 is raised against spring 19 to an upper position, it cuts off communication between pipes 13 and 13a and vents the lower chamber 5 to atmosphere through pipe 13 and air vent 17. The valve 14, as illustrated, is operable electromagentically by means of a solenoid or electromagnet 14a which, when energized, raises the valve member 15 to break any vacuum in chamber 5. When the solenoid 14a is de-energized, valve member 15 is returned to its lower position so that chamber 5 can be evacuated through pipes 13—13a. The solenoid 14a is connected through wires 14b and 14c to the relay circuitry 9.

When the releaser is used in a washing operation, a container 18 is located below the bottom outlet 5a to hold a supply of washing liquid and to receive washing liquid which has entered the releaser through milk pipe line 3, the washing liquid being sucked from container 18 through a pipe 16 and into the upper chamber 4 by way of milk pipe line 3. Leading from the bottom 11 of lower chamber 5 is a pipe 20 forming a second outlet from this chamber. The pipe 20 leads to the first can 21 of a battery of milk cans located below the level of the bottom 11 of the releaser. For simplicity, only two such cans are shown, the second being indicated at 22. These cans are interconnected by a conduit 20a, and the last milk can 22 of the battery is connected through a pipe 23 to the vacuum line 2. It will be understood that the pipes 20 and 23 and conduit 20a extend through sealed closures or covers for the respective cans so that once the first can 21 has been filled from pipe 20, the second can 22 is filled therefrom through conduit 20a, under the suction effect from pipe 23 and gravity flow from chamber 5. A valve 24 is located in the pipe 20.

Referring to FIG. 2, the grounded wire 8 leads to the negative side of a battery or current source 25, the positive side of which is connected through a relay 26 and wire 12 to the upper contact 12a. The relay 26 has normally open switches 27 and 28, the switch 27 being adapted to connect wire 10 through relay 26 to the positive side of battery 25, and the switch 28 being adapted to connect solenoid 14a across battery 25 through wires 14b, 14c and 29. A short-circuiting switch 30 is connected across the wires 8 and 12.

The operation of the apparatus as a washing releaser will now be described. When the vacuum pump is started, the vacuum line 2 evacuates upper chamber 4 directly and evacuates lower chamber 5 through pipe 13, valve 14, and pipe 13a. As a result, washing liquid is drawn from container 18 through pipes 16 and 3 into chamber 4, from which it enters lower chamber 5 through inlet 4a and flap valve 6. Due to the partial vacuum in chamber 5, its bottom outlet 5a is closed by flap valve 7, the second outlet 20 also being closed by valve 24. When the liquid level in chamber 5 rises to the contact 12a, a circuit is established through wire 12, relay 26, battery 25, wire 8, and back to contact 12a by electrical conduction through the liquid. This circuit, by energizing relay 26, closes switches 27 and 28, thereby energizing solenoid 14a and establishing a holding circuit from lower contact 10a through switch 27, relay 26, battery 25, wire 8, and back to contact 10a by conduction through the liquid. When solenoid 14a is thus energized, it raises valve member 15 to disconnect chamber 5 from pipe 13a and connect this chamber to air vent 17, thereby breaking the partial vacuum in the lower chamber. Consequently, the flap valve 6 will close and liquid will discharge from lower chamber 5 through bottom outlet 5a and its flap valve 7 into the chamber 18. When the liquid level in the chamber 5 now falls below the lower contact 10a, thereby breaking the holding circuit previously described, the relay 26 is de-energized so as to open the switches 27—28 and de-energize the solenoid 14a. This causes the valve member 15 to return to its lower position so that chamber 5 is again evacuated through pipes 13—13a. The operation described above is then repeated.

The new releaser, when used in the washing operation, has the advantage that it can continuously draw washing liquid through the pipe 16 and the milk pipe line 3. A good mechanical washing action can be obtained, however, by providing only a certain amount of washing liquid in the container 18 so that this liquid is sucked through the pipes 16 and 3 only batchwise in the rhythm in which the liquid flows out from the chamber 5, so that air is drawn through these pipes between the liquid batches.

When the releaser is operated as a milk releaser, milk passes from pipe 3 into chamber 4 and from the latter intermittently into chamber 5, from which it is discharged intermittently through bottom outlet 5a into atmospheric air in the same manner as previously described in connection with the washing operation, it being understood that the milk level in chamber 5 controls the relay circuitry 9 in the same manner as the washing liquid.

When it is desired to use the releaser for tapping off milk from the milking system under vacuum, the valve 24 is opened. The milk entering upper chamber 4 from milk pipe 3 flows downward into chamber 5 and then flows downward through pipe 20 into the first can 21, which is maintained under vacuum from can 22 and pipe 23. In this case, the milk is not sucked into the cans but flows into them by gravity from the lower chamber 5. The air entrained in the milk entering upper chmber 4 from pipe 3 is immediately drawn away from this chamber through vacuum line 2. Since the milk level in the lower chamber 5 does not normally rise in this operation, the relay circuitry 9 does not actuate the magnetic valve 14. If it is desired to discharge milk from the vacuum system at some point in this can-filling operation, this can be done by closing the valve 24. In this way, the apparatus will operate as a milk releaser. That is, the milk level will rise to the upper contact 12a and thereby operate the relay circuitry 9 and control valve 14 to vent the lower chamber 5, whereby milk will discharge through the flap valve 7. If it is then desired to resume the operation of tapping off milk into the cans, the valve 24 is re-opened.

When the milk level in chamber 5 rises due to shutting of valve 24, it is possible to break the vacuum in chamber 5 before the milk level reaches the upper contact 12a, thereby effecting discharge of milk through flap valve 7 of the bottom outlet 5a. This can be done by closing the short-circuiting switch 30, so that the electrical connection between wires 8 and 12 otherwise effected by the milk is now obtained by the switch 30. In this way, it is possible to discharge from chamber 5 a quantity of milk smaller than that corresponding to the quantity when the milk level is at the upper contact 12a.

The new universal releaser differs from milking releasers as commonly made heretofore in that the lower chamber 5 is always filled to the same degree, so that good efficiency is obtained. In prior milking systems, the lower chamber of the releaser was changed over periodically from a communication with atmosphere to a communication with vacuum, and vice versa, by means of a pulsation device or pulsator, whereby the degree of filling of this lower chamber was dependent on the operating rhythm of the pulsator.

As will be apparent, other means than the control valve 14 may be employed for alternately creating and breaking a vacuum in lower chamber 4 under control of the liquid level therein. For example, this may be done by means of a float which either directly actuates a valve or controls an electromagnetic valve through electrical contacts.

It will be understood that the probe contacts 10a and 12a, and their associated circuitry for operating switch 28, constitute means for sensing high and low liquid levels in lower chamber 5; and the electromagnetic valve 14 constitutes control means operatively connected to such sensing means and including a device 19 responsive to a predetermined low liquid level in the lower chamber for connecting it to the vacuum line 2, and a device 14a responsive to a predetermined high liquid level in the lower chamber for venting it to atmosphere at 17.

I claim:

1. In a milking system having a milk pipe line and a vacuum pipe line, a combined milking and washing releaser comprising container means forming an upper chamber connected to both of said pipe lines, whereby liquid can be drawn from the milk line into the chamber by partial evacuation thereof through the vacuum line, the container means also forming a lower chamber having a liquid inlet from the upper chamber and having a liquid outlet, valve means for said inlet and outlet operable to open said inlet and close said outlet upon creation of a partial vacuum in the lower chamber, said valve means being operable to close the inlet and open the outlet upon breaking of said vacuum in the lower chamber, means for sensing high and low liquid levels in said lower chamber, and control means operatively connected to said sensing means and including a device responsive to a predetermined low liquid level in the lower chamber for connecting it to the vacuum line, and a device responsive to a predetermined high liquid level in the lower chamber for venting it to atmosphere.

2. A releaser according to claim 1, in which said control means also include a control valve having a vent to atmosphere and operable in a first position to connect the lower chamber to said vent and in a second position to connect the vacuum line to the said lower chamber while disconnecting said last chamber from said vent, said responsive devices operatively connecting the control valve to said level sensing means.

3. A releaser according to claim 1, in which said control means also include a control valve having a vent to atmosphere and operable in a first position to connect the lower chamber to said vent and in a second position to connect the vacuum line to the lower chamber while disconnecting said last chamber from the vent, said responsive devices including an electromagnet operatively connecting the control valve to said level sensing means.

4. A releaser according to claim 1, in which said control means also include a control valve having a vent to atmosphere and operable in a first position to connect the lower chamber to said vent and in a second position to connect the vacuum line to the lower chamber while disconnecting said last chamber from the vent, said responsive devices including an electromagnet operatively connecting the control valve to said level sensing means, said level sensing means including electrical contacts at the upper and lower portions, respectively, of the lower chamber.

5. A releaser according to claim 1, comprising also a pipe leading from the bottom portion of the lower chamber and forming a second liquid outlet therefrom, and a valve in said second outlet for opening and closing the same.

6. A releaser according to claim 1, comprising also a pipe leading from the bottom portion of the lower chamber and forming a second liquid outlet therefrom, a closed milk receptacle into which said last pipe leads and located below the level of said lower chamber, and conduit means connecting the interior of said receptacle to the vacuum pipe line.

7. A releaser according to claim 1, in which said control means also include an element operable to vent the lower chamber to atmosphere independently of said high level responsive device.

8. A releaser according to claim 1, in which said control means also include a control valve having a vent to atmosphere and operable in a first position to connect the lower chamber to said vent and in a second position to connect the vacuum line to the lower chamber while disconnecting said last chamber from the vent, said responsive devices including an electromagnet, operatively connecting the control valve to said level sensing means, and a short-circuiting element connected to said high level responsive device for operating the electromagnet to move the control valve to its first position independently of said high level responsive device.

References Cited in the file of this patent
UNITED STATES PATENTS

| | | |
|---|---|---|
| 1,195,573 | Forsyth | Aug. 22, 1916 |
| 1,962,192 | Hapgood | June 12, 1934 |